(12) United States Patent
Badon et al.

(10) Patent No.: US 7,298,279 B1
(45) Date of Patent: Nov. 20, 2007

(54) OPEN-ENDED DEVICE MONITORING SYSTEM

(75) Inventors: Doug Badon, Prairieville, LA (US);
Klein W. Kirby, Plaquemine, LA (US);
Lane M. Stout, Gonzales, LA (US)

(73) Assignee: The Williams Companies, Inc., Tulsa, OK (US)

( * ) Notice: Subject to any disclaimer, the term of this patent is extended or adjusted under 35 U.S.C. 154(b) by 208 days.

(21) Appl. No.: 11/133,788

(22) Filed: May 19, 2005

(51) Int. Cl.
*G08B 21/00* (2006.01)

(52) U.S. Cl. ............... 340/605; 340/514; 340/614; 340/442; 73/146.5; 116/34 R; 200/61.22

(58) Field of Classification Search ......... 340/605, 340/614, 514, 442–449, 501; 73/31.05, 24.01, 73/40, 146.5, 146.8; 116/34 R; 200/61.22; 137/233

See application file for complete search history.

(56) References Cited

U.S. PATENT DOCUMENTS

| | | | |
|---|---|---|---|
| 3,922,515 A * | 11/1975 | Meisenheimer, Jr. | 200/83 S |
| 4,173,988 A | 11/1979 | Fowler | |
| 4,554,949 A * | 11/1985 | Sell | 137/899 |
| 4,595,123 A | 6/1986 | Libit | |
| 4,691,728 A | 9/1987 | Mathison | |
| 4,880,028 A | 11/1989 | Osburn et al. | |
| 4,915,055 A | 4/1990 | Ptashinski | |
| 5,003,735 A | 4/1991 | Bates | |
| 5,163,480 A | 11/1992 | Huber | |
| 5,303,743 A | 4/1994 | Vincent | |
| 5,450,765 A | 9/1995 | Stover | |
| 5,452,749 A | 9/1995 | Johnson et al. | |
| 5,472,302 A | 12/1995 | Yandle, II | |
| 5,676,174 A | 10/1997 | Berneski, Jr. et al. | |
| 6,079,252 A * | 6/2000 | Tabler et al. | 73/40 |
| 6,170,515 B1 | 1/2001 | Peterson et al. | |
| 6,363,973 B1 | 4/2002 | Fiebig | |
| 6,498,991 B1 | 12/2002 | Phelan et al. | |
| 6,502,632 B1 | 1/2003 | Pittman | |
| 6,525,655 B2 * | 2/2003 | Huang | 340/442 |
| 6,530,259 B1 * | 3/2003 | Kelly et al. | 73/23.2 |
| 6,588,804 B2 | 7/2003 | McGrath | |
| 6,745,257 B2 | 6/2004 | Gallo et al. | |
| 6,807,987 B2 | 10/2004 | Hill et al. | |
| 6,811,187 B2 | 11/2004 | Otten et al. | |
| 2005/0021724 A1 | 1/2005 | Kung et al. | |

OTHER PUBLICATIONS

Martin Haenggi, *Distributed Sensor Networks: A Cellular Nonlinear Network Perspective*, International Journal of Neural Systems, Dec. 2003, 405-414, vol. 13, No. 6, World Scientific Publishing Company.

* cited by examiner

*Primary Examiner*—Anh V. La
(74) *Attorney, Agent, or Firm*—Crowe & Dunlevy, PC

(57) ABSTRACT

An emission prevention system for use on an open-ended line includes an end-cap and a proximity sensor. The proximity sensor is preferably configured to detect a change in the extent of engagement between the end-cap and the open-ended line. A method of monitoring the engagement of the end-cap and the open-ended line includes the steps of measuring the engagement between the end-cap and the open-ended line with a proximity sensor, producing a position signal representative of the engagement between the end-cap and the open-ended line and transmitting the position signal to an operator terminal. A monitoring network may be established by monitoring a plurality of emission prevention systems.

21 Claims, 4 Drawing Sheets

OPEN-ENDED DEVICE MONITORING SYSTEM

FIELD OF THE INVENTION

This invention relates generally to the field of equipment monitoring systems and more particularly to a system for monitoring the engagement of an end-cap on an open-end line.

BACKGROUND

Environmental regulatory agencies around the world have enacted numerous rules and regulations governing the release of gaseous emissions into the environment. The unintended release of gaseous pollutants into the environment, often referred to as "fugitive emissions," can create significant concerns. Such emissions are often associated with the operation of industrial facilities, such as electric power plants and petroleum refineries. Pumps, compressors and other machines that operate under pressure are especially susceptible to fugitive emissions.

Open-ended lines are frequently used for a wide variety of applications in a number of industrial environments. In many cases, open-ended lines are employed as sampling ports that can be used to conveniently draw samples from process equipment. In other situations, open-ended lines are used as vents downstream of pressure relief systems or valves. In these and other applications, open-ended lines are susceptible to fugitive emissions. Faulty valve seats or incompletely closed vales can result in leakage through the open end. To prevent fugitive emissions from open-ended lines, regulators encourage the use of blinds, caps, plugs or additional valves on the open-ended line.

Although generally effective, such preventative modifications are nonetheless capable of failing. Accordingly, rigorous leak detection and repair (LDAR) programs must be followed. In the past, LDAR programs have placed particular emphasis on detecting the source of fugitive emissions after a leak has occurred. In most cases, a portable emission detector is used to periodically examine pieces of equipment that are susceptible to leakage. While effective at identifying the source of an emission, standard periodic evaluation cannot be relied upon to accurately determine when the leak first occurred or what volume of emissions were leaked over time. Furthermore, periodic monitoring for fugitive emissions is not well suited to forecast equipment failures that may lead to fugitive emissions. It is to these and other deficiencies in the prior art that the preferred embodiments of the present invention are directed.

SUMMARY OF THE INVENTION

A preferred embodiment of the present invention includes an emission prevention system for use on an open-ended line. The emission prevention system preferably includes an end-cap configured for engagement on the open-ended line and a proximity sensor. The proximity sensor is preferably configured to detect a change in the extent of engagement between the end-cap and the open-ended line. Another aspect of the present invention includes a method of monitoring the engagement of an end-cap connected to an open-ended line. The method preferably includes the steps of measuring the engagement between the end-cap and the open-ended line with a proximity sensor, producing a position signal representative of the engagement between the end-cap and the open-ended line and transmitting the position signal to an operator terminal. In yet another aspect, a preferred embodiment of the present invention includes a monitoring network for monitoring a plurality of sealed open-ended lines.

DETAILED DESCRIPTION OF THE PREFERRED EMBODIMENT

Figure 1:
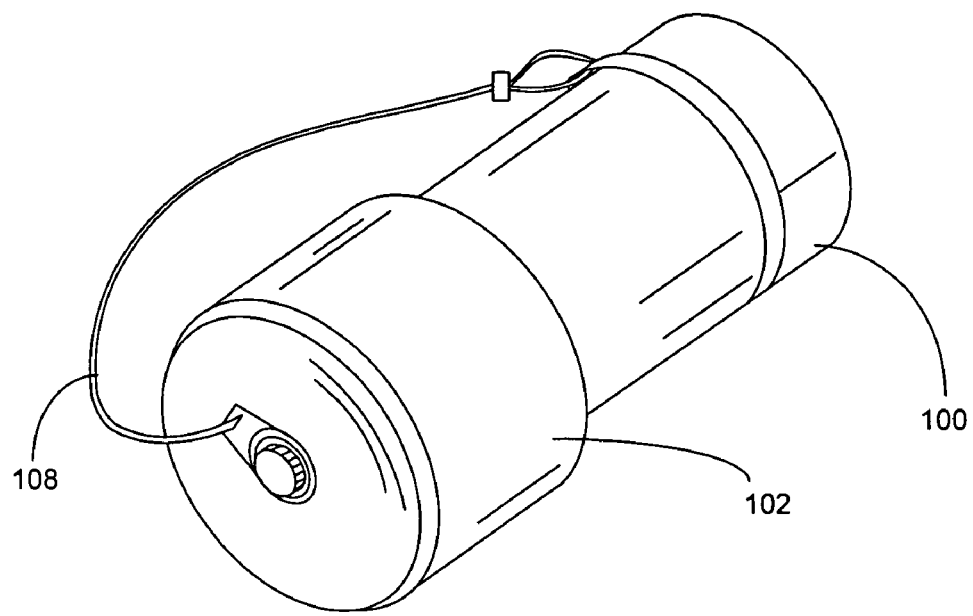
FIG. 1 is a perspective view of an open-ended line with an end-cap constructed in accordance with a preferred embodiment of the present invention.

Turning first to FIG. 1, shown therein is a perspective view of an open-ended line 100 with an attached end-cap 102. The open-ended line 100 may be used for a wide variety of applications in a number of industrial environments. In many cases, the open-ended line 100 is used as a sampling port that can be used to conveniently draw samples from process equipment. The end-cap 102 is generally used to prevent fugitive emissions from exiting the open-ended line 100. As used herein, the term "end-cap" will refer to any cap, blind, plug, seal or other block used to seal an open-ended line. It will be understood that the utility of the preferred embodiments will find utility in a variety of installations, applications and industrial environments. Such additional applications may include, for example, tamper-alert security systems for water treatment facilities.

Figure 2:
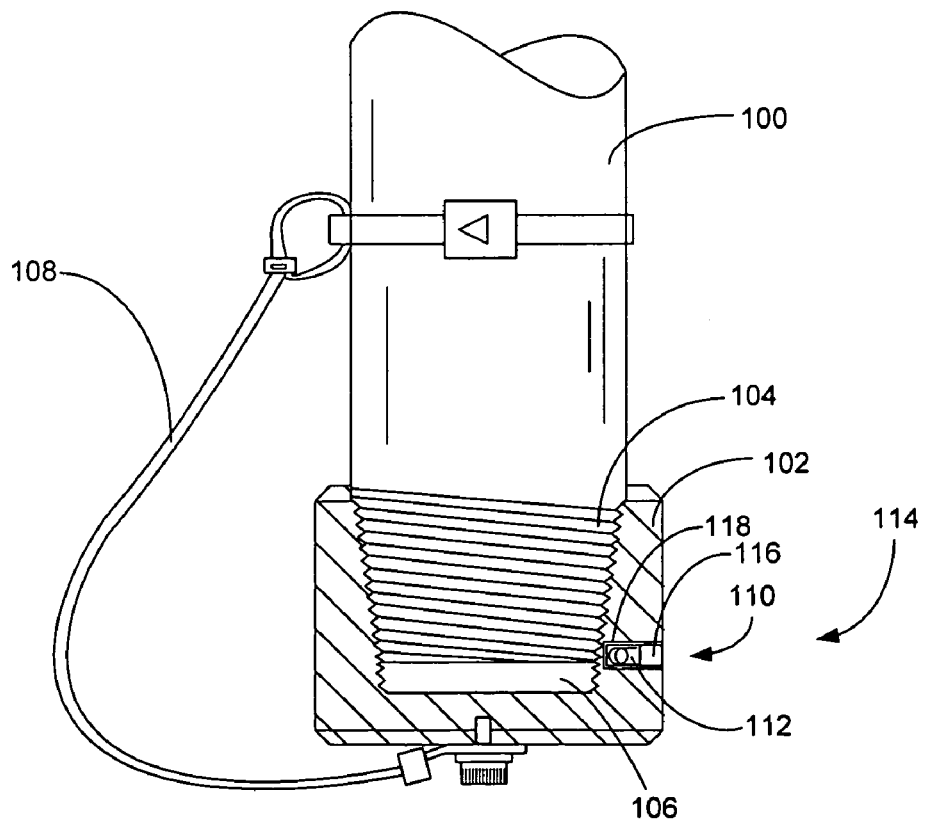
FIG. 2 is a cross-sectional view of an open-ended line and end-cap constructed in accordance with a preferred embodiment of the present invention.

Turning now to FIG. 2, shown therein is a top view of the open-ended line 100 with a cross-sectional view of the end-cap 102. The open-ended line 100 preferably includes a threaded end portion 104. The end-cap 102 preferably includes a threaded socket 106 that is configured for threaded engagement with the threaded end portion 104. The threaded engagement of end-caps on open-ended lines is well known in the art. To prevent the end-cap 102 from being removed from the open-ended line 100 when disengaged, the end-cap 102 optionally includes a cable tie 108 tethered to the open-ended line 100. Unless otherwise specified, the open-ended line 100 and end-cap 102 are constructed in accordance with American Society of Mechanical Engineers (ASME) standards.

Also shown in FIG. 2 is a monitoring device 110. The monitoring device 110 is generally configured to detect and report a movement in or change in position between the end-cap 102 and the open-ended line 100. In a particularly preferred embodiment, the sensor 112 is an inductive proximity sensor that is capable of producing a "position signal" representative of the extent to which the end-cap 102 is threaded onto the open-ended line 100. The monitoring device 110 and the end-cap 102 collectively form a monitoring system 114. In a presently preferred application, the monitoring system 114 is used as an emission detection system. It will be understood, however, that the monitoring system 114 can be used for additional and alternative applications, such as, for example, as a tamper-detection security system.

In an alternate preferred embodiment, the sensor 112 is configured to provide an absolute signal (i.e., "on/off") based on a predetermined threshold level of engagement. Suitable inductive proximity sensors are available from a variety of sources, including the Honeywell Corporation of Morristown, N.J. It will be understood that other types of proximity sensors, such as capacitive or ultrasonic sensors, could be used as an alternative to inductive proximity sensors.

Depending on the requirements of specific applications, the monitoring device 110 may include additional components and functionality. For example, the monitoring device 110 optionally includes a communications module 116. If used, the communications module 116 is operably connected to the sensor 112 and configured to transmit information from the sensor 112. As discussed below, the communications module 116 may also be configured to receive and transmit information from other emission prevention devices as part of a larger monitoring network.

With these components, the monitoring system 114 is capable of monitoring the engagement of the end-cap 102 on the open-ended line 100. In a particularly preferred embodiment, the monitoring functionality is accomplished by measuring the engagement between the end-cap 102 and the open-ended line 100 with the proximity sensor 112. The proximity sensor 112 then produces a "position signal" representative of the engagement between the end-cap 102 and the open-ended line 100. The position signal is then preferably transmitted to an operator terminal for processing and observation. To preserve power, the monitoring device 110 can be configured to measure the engagement between the end-cap 102 and the open-ended line 100 on a periodic basis.

In an alternate preferred embodiment, the position signal is only transmitted to the operator terminal if a change in the engagement between the end-cap 102 and the open-ended line 100 is detected by the proximity sensor 112. To detect a change in engagement over time, it may be necessary to calibrate the proximity sensor 112 with an "initial signal" that represents satisfactory engagement between the end-cap 102 and the open-ended line 100. Once calibrated, the monitoring device 110 is preferably configured to transmit the position signal to the operator terminal if the end-cap becomes less than satisfactorily engaged.

In certain applications, it may be necessary to separately identify unique monitoring systems 114 within a larger network. In a presently preferred embodiment, each monitoring system 114, proximity sensor 112 or end-cap 102 is assigned an electronic identifier. The electronic identifier can then be paired with the position signal transmitted from the monitoring system 114. In this way, input from multiple monitoring systems 114 can be differentiated and separately examined by automated controls or human operators.

In the first preferred embodiment shown in FIG. 2, the monitoring system 114 is configured with the monitoring device 110 secured inside the end-cap 102 in a position adjacent the threaded socket 106. In this position, the monitoring device 110 is designed to detect the presence of the threaded end portion 104 of the open-ended line 100 within the threaded socket 106. Because the monitoring device is housed inside the end-cap 102, the preferred embodiment of the monitoring system 114 shown in FIG. 2 is well suited for use on newly manufactured end-caps.

In a particularly preferred embodiment, the monitoring device 110 is retained in a bore 118 that extends from the external surface of the end-cap 102 to a location proximate the threaded socket 106. This configuration facilitates installation of the monitoring device 110 in the end-cap 102 without compromising the seal provided by the threaded socket 106. Additionally, wired leads or antenna can be connected to the monitoring device 110 through the bore 118. It will be understood that the configuration and installation of the monitoring device 110 within the end-cap 102 may vary depending on the particular requirements and specifications provided by the manufacturers of the selected components.

Figure 3:
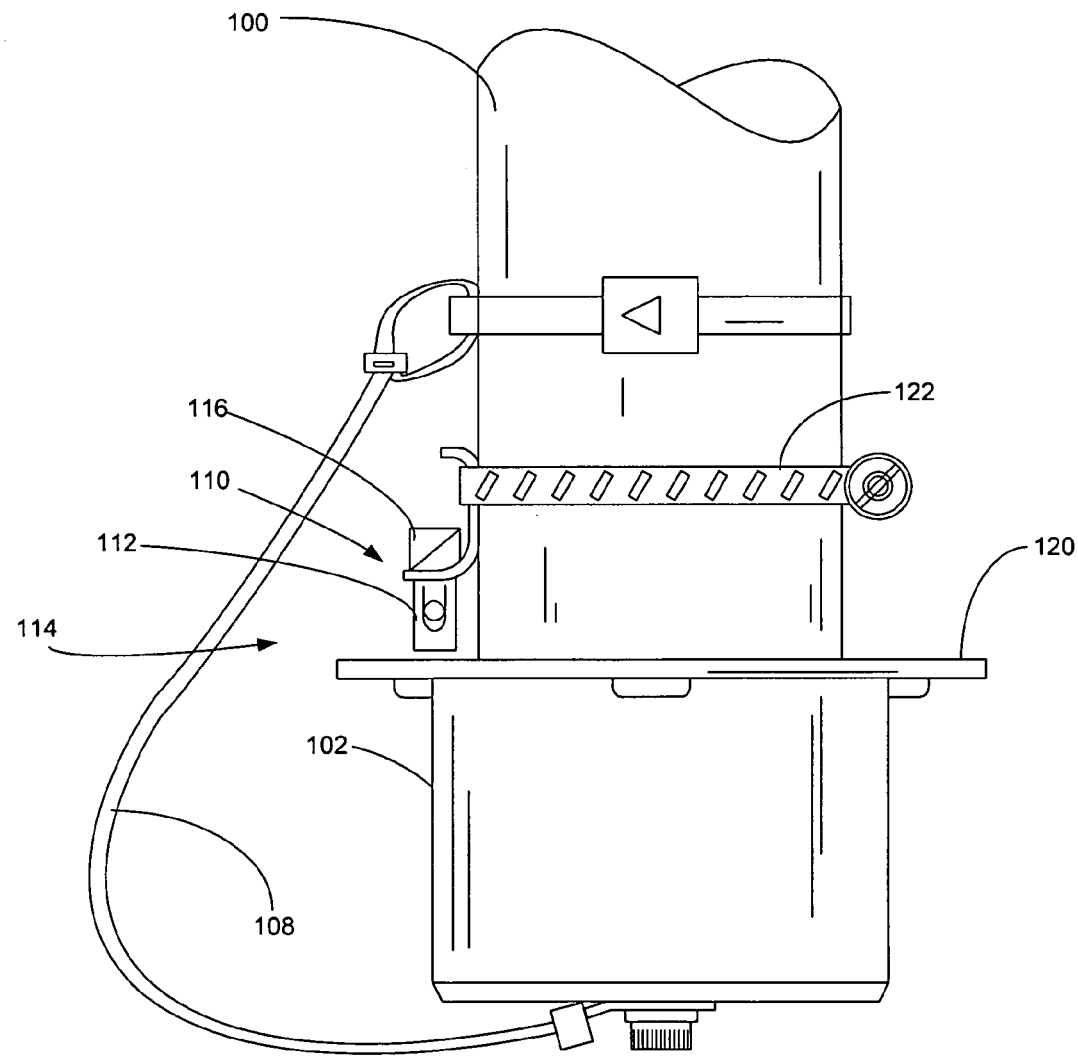
FIG. 3 is a partial cross-sectional view of an open-ended line and end-cap constructed in accordance with an alternate preferred embodiment of the present invention.

Turning to FIG. 3, shown therein is a top view of a second preferred embodiment of the monitoring system 114 installed on the open-ended line 100. As shown in FIG. 3, the end-cap 102 includes an integral flange 120. The monitoring device 110 is secured with a movable fastener 122 to the open-ended line 100 in a position external to the end-cap 102. Once the end-cap 102 has been installed, the monitoring device 110 can be adjusted with the movable fastener 122 into a position proximate the flange 120. The sensor 112 is then configured to detect an initial distance between the monitoring device 110 and the flange 120. In the event the end-cap 102 begins to disengage, the sensor 112 produces a "position signal" indicative of the change in position. Because the monitoring device 110 can be easily installed on an existing system without significant modification to the end-cap 102, the alternate preferred embodiment disclosed in FIG. 3 is advantageous for retrofit applications.

The presently preferred embodiments of the monitoring system 114 have been disclosed as having an end-cap 102 that has a female threaded socket 106. It will be appreciated by those of skill in the art, however, that the monitoring system 114 might alternatively make use of a plug that includes a male threaded portion manufactured to engage an open-ended line with a female receptacle. In such alternate embodiments, the monitoring device 110 could be either located on the open-ended line to detect the engagement of the plug or installed on the plug to detect the presence of the open-ended line.

Figure 4:
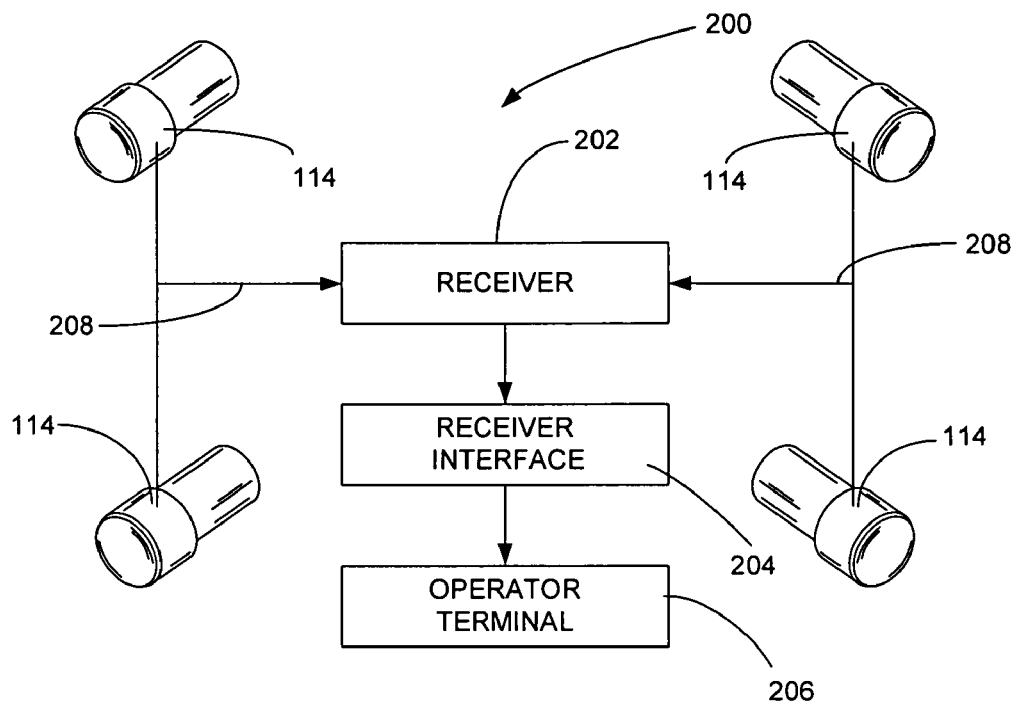
FIG. 4 is a graphical representation of a monitoring network constructed in accordance with a first preferred embodiment.

Turning now to FIG. 4, shown therein is a functional representation of a first preferred embodiment of a monitoring network 200. The monitoring network 200 includes a plurality of monitoring systems 114, a receiver 202, a receiver interface 204 and an operator terminal 206. It will be understood that the monitoring devices 110 may be positioned internal to the end-caps 102 (as in FIG. 2), external to the end-caps 102 (as in FIG. 3) or some combination of internally and externally positioned monitoring devices 110. The monitoring network 200 is preferably constructed by connecting electrical wiring 208 between the sensors 112 and the receiver 202. A separate communications module 116 may not be required to transfer information from the sensors 112 to the receiver 202. Although electrical wiring 208 is presently preferred, it will be appreciated by those of skill in the art that alternative forms of wiring, such as, for example fiber optic cable, are also encompassed within the scope of this preferred embodiment.

In operation, the sensors 112 provide the receiver 202 with real time or periodic information about the engagement of the end-caps 102 on the open-ended lines 100. This information is passed from the receiver 202 through the receiver interface 204 to the operator terminal 206. In the event that an end-cap 102 starts to disengage or becomes completely disengaged from the associated open-ended line 100, a notification is presented at the operator terminal 206. In this way, corrective action can be taken as soon as the equipment failure occurs.

Figure 5:
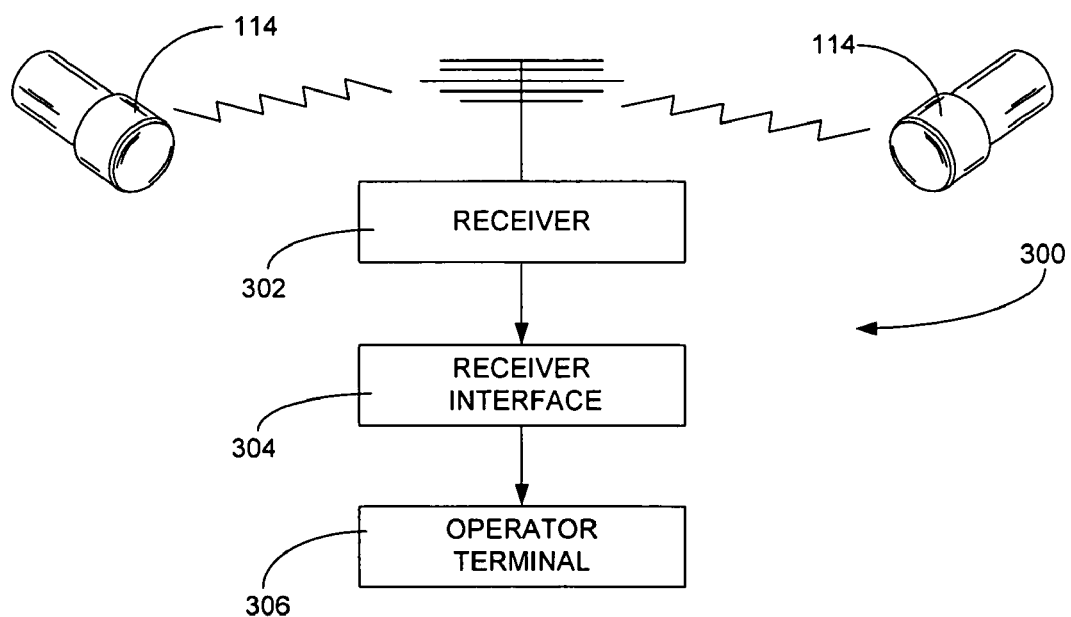
FIG. 5 is a graphical representation of a monitoring network constructed in accordance with a second preferred embodiment.

Turning to FIG. 5, shown therein is a functional representation of a second preferred embodiment of a monitoring network 300. The monitoring network 300 preferably includes a plurality of monitoring systems 114, a receiver 302, a receiver interface 304 and an operator terminal 306. The monitoring network 300 is preferably configured as a wireless network in which signals from the sensors 112 are transmitted to the receiver 302 by the communications module 116 (not shown in FIG. 5).

For use in the monitoring network 300, the communications module 116 preferably includes a wireless transmitter (not separately shown) that is configured to deliver a signal from the sensor 112 to the receiver 302 over a direct wireless transmission. In the event that the thread engagement between the end-cap 102 and open-ended line 100 changes, a notification is presented at the operator terminal 306. In a particularly preferred embodiment, each monitoring device 110 is given a unique identification that accompanies the transmission of a position signal to the receiver 302. Suitable wireless electronics are available from numerous sources, including Crossbow Technology, Inc. of San Jose, Calif.

Figure 6:
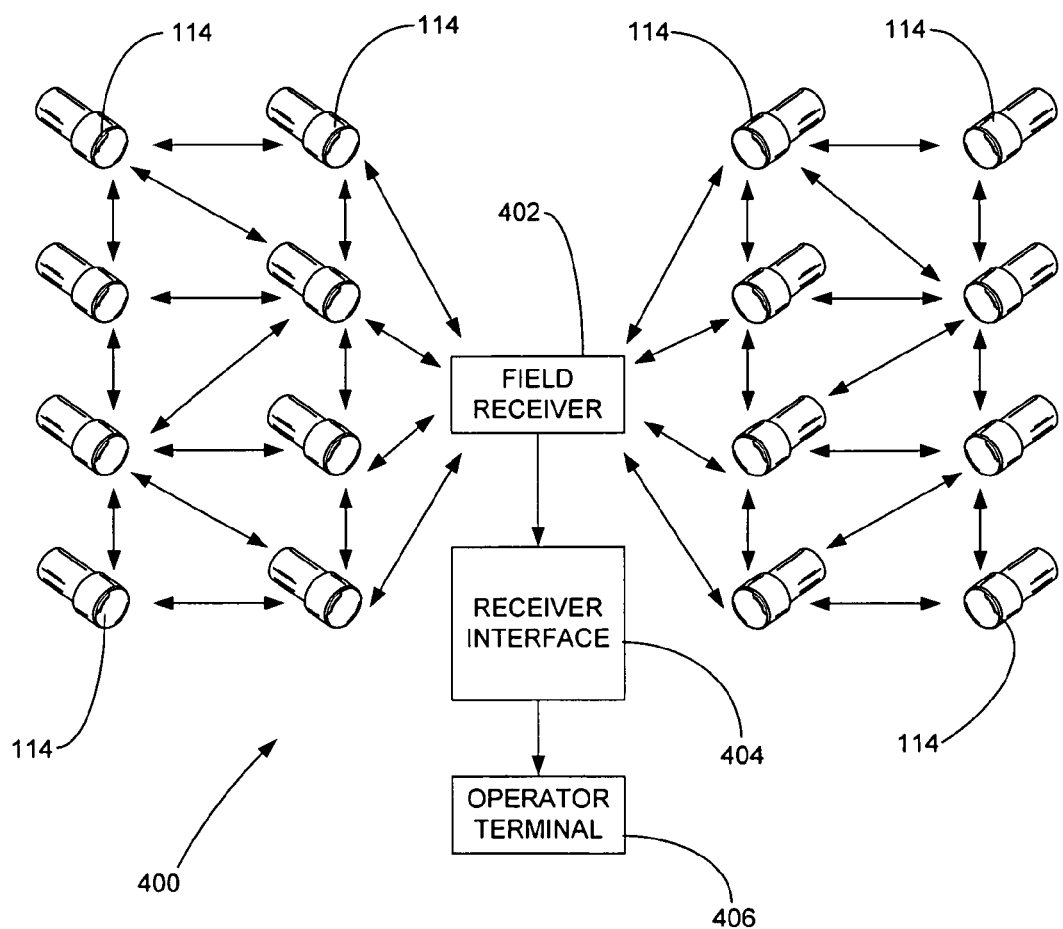
FIG. 6 is a graphical representation of a monitoring network constructed in accordance with a third preferred embodiment.

Turning to FIG. 6, shown therein is a functional representation of a third preferred embodiment of the monitoring network 400, which is configured as a cellular, ad hoc wireless network. The monitoring network 400 preferably includes a plurality of monitoring systems 114, at least one field receiver 402, a receiver interface 404 and an operator terminal 406. Information received by the receiver interface 404 can be gathered and stored on the operator terminal 406. This information can be used to provide reporting, trending and alarming functions.

For use in the monitoring network 400, each communications module 116 preferably includes a small computer, or "mote," that is operably connected to the sensor 112. Each mote preferably includes a small battery, a processor, memory, an onboard operating system and a bi-directional radio component. Each mote is preferably configured to send and receive signals from nearby motes or a nearby field receiver. When clustered together, the motes create a flexible, low-power network between the associated monitoring systems 114. Suitable motes are available from Crossbow Technology, Inc. of San Jose, Calif.

In a particularly preferred embodiment, each monitoring device 110 is given a unique identification that accompanies the transmission of information from the monitoring device 110. The monitoring devices 110 are preferably configured to send position signals representative of the engagement between the end-cap 102 and the open-ended line 100 to the field receiver 402. In a particularly preferred embodiment, the monitoring device 110 is configured to only send a signal to the field receiver 402 in the event the end-cap 102 moves relative to the open-ended line 100. Additional information, such as battery life, can also be transmitted through the monitoring network 400 by the monitoring devices 110.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A monitoring system for use on an open-ended line, the monitoring system comprising:
    an end-cap, wherein the end-cap is configured for engagement on the open-ended line; and
    a proximity sensor, wherein the proximity sensor is configured to detect a change in the extent of engagement between the end-cap and the open-ended line.

2. The monitoring system of claim 1, wherein the proximity sensor is housed inside the end-cap.

3. The monitoring system of claim 1, wherein the proximity sensor is attached to the open-ended line.

4. The monitoring system of claim 1, wherein the proximity sensor produces a position signal representative of the engagement of the end-cap on the open-ended line.

5. The monitoring system of claim 4 further comprising a communication module configured to transmit the position signal produced by the proximity sensor.

6. The monitoring system of claim 5, wherein the communication module transmits the position signal over a wireless connection.

7. The monitoring system of claim 5, wherein the communication module transmits the position signal to a receiver over a wired connection.

8. The monitoring system of claim 1, wherein the monitoring system further includes a mote configured to transfer information from the proximity sensor to a field receiver over an ad hoc network of like monitoring systems.

9. A monitoring network for monitoring a plurality of open-ended lines, the monitoring network comprising:
    a first emission prevention system having a first monitoring device and a first end-cap, wherein the first monitoring device is configured to produce a position signal representative of the position of the first end cap on a first open-ended line; and
    a second emission prevention system having a second monitoring device and a second end-cap, wherein the second monitoring device is configured to relay the position signal produced by the first monitoring device to a field receiver.

10. The monitoring network of claim 9, wherein the second monitoring device is configured to produce a position signal representative of the position of the second end cap on the second open-ended line.

11. The monitoring network of claim 10, wherein the first monitoring device is configured to relay the position signal produced by the second monitoring device to a field receiver.

12. The monitoring network of claim 11 further comprising a receiver interface and an operator terminal connected to the field receiver.

13. A method of monitoring the engagement of an end-cap connected to an open-ended line, the method comprising the steps of:
    measuring the engagement between the end-cap and the open-ended line with a proximity sensor;
    producing a position signal representative of the engagement between the end-cap and the open-ended line; and
    transmitting the position signal to an operator terminal.

14. The method of claim 13, wherein the position signal is only transmitted to the operator terminal if a change in the engagement between the end-cap and the open-ended line is detected.

15. The method of claim 13, further comprising the steps of:
calibrating the proximity sensor with an initial signal representative of satisfactory engagement between the end-cap and the open-ended line; and
transmitting the position signal to the operator terminal if the end-cap becomes less than satisfactorily engaged.

16. The method of claim 13, wherein the step of measuring the engagement between the end-cap and the open-ended line is conducted periodically.

17. The method of claim 13, wherein the step of transmitting the position signal further comprises transmitting the position signal over a wireless connection.

18. The method of claim 13, wherein the step of transmitting the position signal further comprises transmitting the position signal over a wired connection.

19. The method of claim 13, further comprising the steps of:
assigning an electronic identifier to the end-cap;
pairing the electronic identifier with the position signal; and
transmitting the paired electronic identifier and position signal to the operator terminal.

20. The method of claim 19, further comprising the steps of:
receiving a paired electronic identifier and position signal from a second end-cap; and
relaying the paired electronic identifier and position signal from the second end-cap to the operator terminal.

21. The method of claim 19, further comprising the steps of:
receiving a paired electronic identifier and position signal from a second end-cap; and
relaying the paired electronic identifier and position signal from the second end-cap to a third end-cap.

* * * * *